No. 764,461. PATENTED JULY 5, 1904.
F. G. HAMPSON.
APPARATUS FOR AERATING LIQUIDS.
APPLICATION FILED JULY 9, 1902.
NO MODEL. 5 SHEETS—SHEET 4.
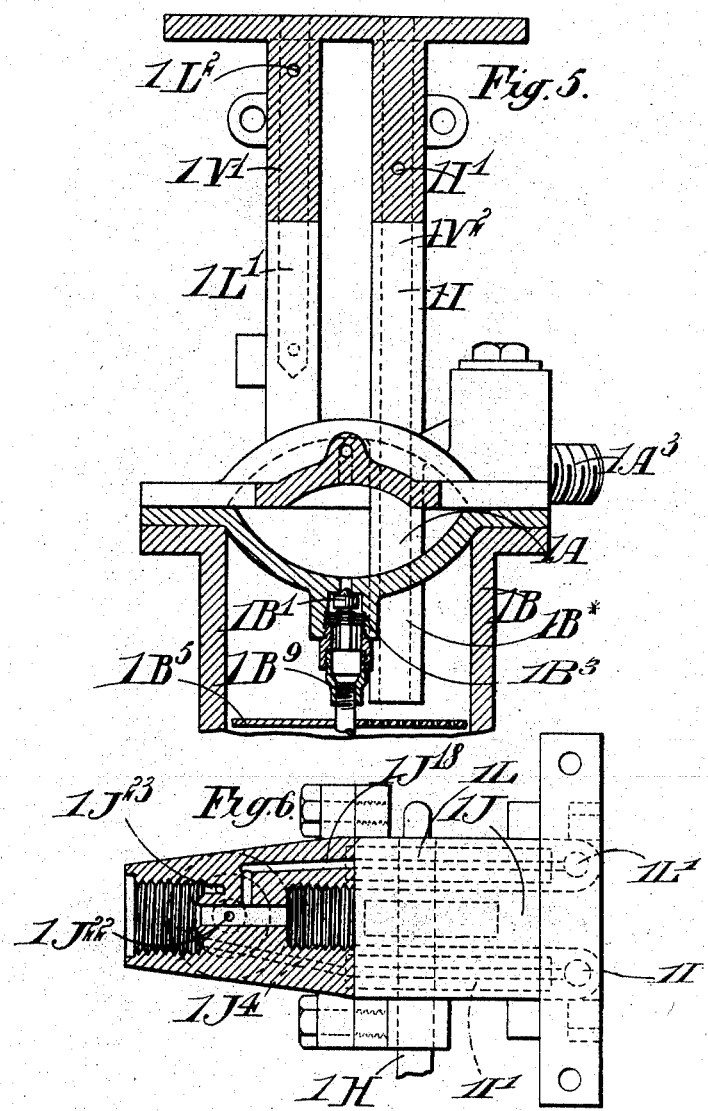

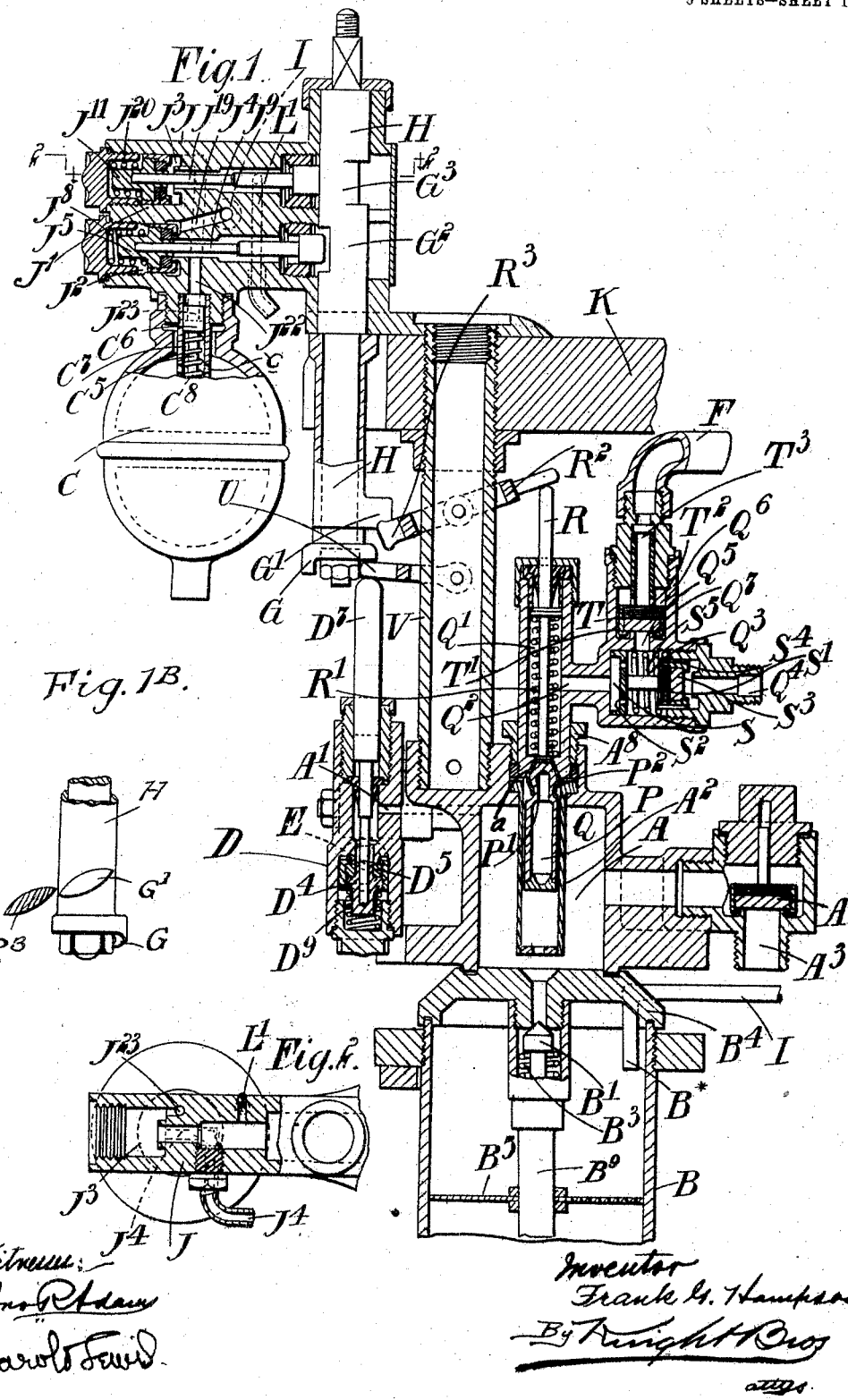

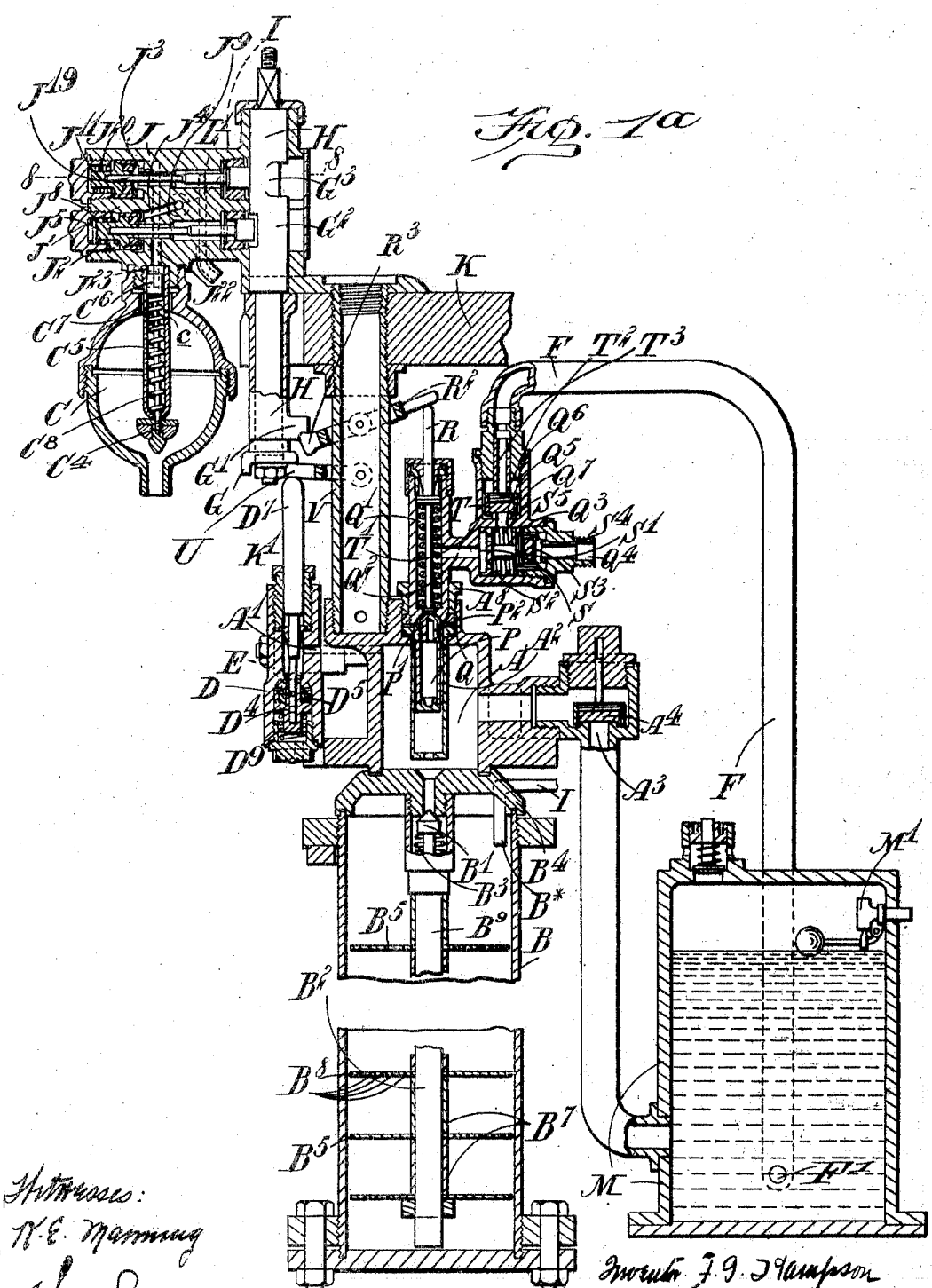

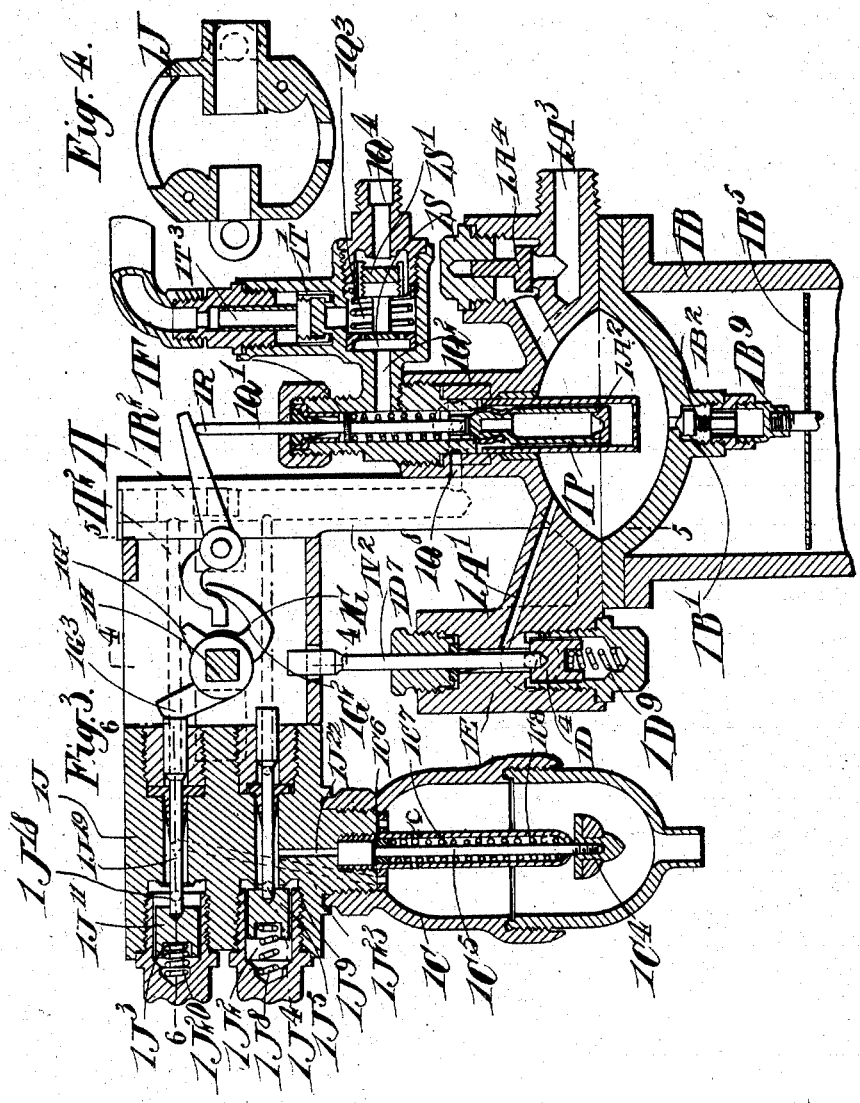

No. 764,461. PATENTED JULY 5, 1904.
F. G. HAMPSON.
APPARATUS FOR AERATING LIQUIDS.
APPLICATION FILED JULY 9, 1902.
NO MODEL. 5 SHEETS—SHEET 5.

No. 764,461. Patented July 5, 1904.

UNITED STATES PATENT OFFICE.

FRANK GEORGE HAMPSON, OF LONDON, ENGLAND.

APPARATUS FOR AERATING LIQUIDS.

SPECIFICATION forming part of Letters Patent No. 764,461, dated July 5, 1904.

Application filed July 9, 1902. Serial No. 114,939. (No model.)

*To all whom it may concern:*

Be it known that I, FRANK GEORGE HAMPSON, a subject of the King of England, residing at Chelsea, London, England, have invented certain new and useful Improvements Relating to Apparatus for Aerating Liquids, of which the following is a specification.

This invention relates to the aeration of liquids, and refers more particularly to apparatus in which the water to be aerated is supplied either under pressure direct from the water-service main or from a filter, storage-tank, or other appropriate source, gas being provided by compression from bottles or in any other convenient manner.

According to this invention the apparatus comprises a receiver into which liquid and gas are admitted from separate sources, a reservoir or aerating-chamber into which the liquid is forced from the receiver by the gas, a delivery vessel into which a portion of the aerated liquid is forced by the pressure in the aerating-chamber when fresh charges are delivered to the latter vessel from the receiver, the liquid being discharged from the delivery vessel preferably after a reduction of pressure. Suitable valves and valve-operating mechanism are also provided, the receiver being provided with a gas-escape nozzle controlled by a buoyant valve or float. A preliminary enriching-chamber is also provided into which the liquid to be aerated is admitted before entering the receiver and wherein it is brought in contact with and is enriched by the excess gas discharged from the main apparatus, this gas-pressure being also employed to force the water from the enriching-chamber into the receiver.

Figure 7:
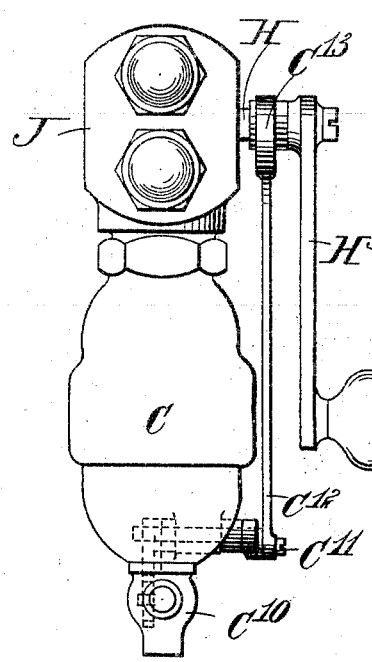
Figure 8:
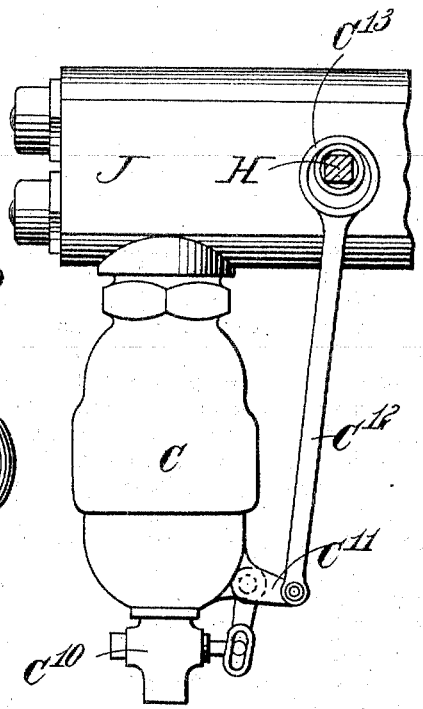

Referring to the drawings, Figure 1 is a sectional elevation of an aerating apparatus constructed in accordance with this invention. Fig. 1$^a$ is a vertical sectional view of an aerating apparatus embodying my invention, parts being broken away. Fig. 1$^b$ is a detail view of the valve-operating spindle and the coöperating parts. Fig. 2 is a section on the line 2 2 of Fig. 1. Fig. 3 is a sectional elevation of a modified construction of apparatus. Figs. 4, 5, and 6 are respectively sections on the lines 4 4, 5 5, and 6 6 of Fig. 3; and Figs. 7 and 8 are end and side elevations of a modified construction of delivery vessel.

Like characters indicate like parts throughout the drawings.

Referring more particularly to Figs. 1 and 2, the receiver A is disposed at the upper end of the aerating vessel B, and its lower end is closed by the top or cover B$^4$ of the latter vessel. The liquid to be aerated enters the receiver through an opening A$^3$, controlled by a plug-valve A$^4$, which may be weighted or spring-controlled to insure its acting rapidly. The liquid-outlet from the receiver is controlled by a non-return valve B', held against its seat by a spring B$^3$, and as the liquid enters the receiver the air or gas therein passes out through an opening $a$ in the top cover controlled by a buoyant valve or float P, which as the liquid rises in the chamber is forced against its seat. The gas-inlet A' of the receiver is controlled by a valve D$^4$, situated in a chamber in a casing D and having a rubber or other face D$^5$ and is normally pressed on its seat by a spring D$^6$. The spindle D$^7$ of the valves passes out through a stuffing-gland and is operated by a cam to admit gas to the chamber, which forces the liquid therein into the aerating vessel, as will hereinafter be described. The liquid passes from the receiver through the valve B' and down a pipe B$^9$, which extends to within a short distance of the bottom of the aerating-chamber and forms a support for diaphragms B$^5$, which are preferably provided with perforations so arranged that the perforations in one diaphragm are diametrically opposite those of a contiguous diaphragm. In the upper part of the aerating vessel is disposed a liquid-outlet pipe B*, leading to a pipe I, by which the aerated liquid is led to a chamber J$^2$ in a casing J, which is divided by a partition J' into two compartments J$^2$ and J$^3$. The casing J forms a support for the delivery vessel C and rests on a counter or other support K, which is provided with a hole or opening through which a pillar V, carrying the receiver and aerating vessel, passes, so as to enable the parts to be readily fitted together when desired. In the chamber J$^2$ is fitted a valve J$^5$, controlled by a spring J$^9$ and provided with an operating-spindle J$^9$, similar to the gas-inlet valve $D^4$ on the receiver. When this valve is opened, liquid passes from the chamber $J^2$ by a conduit $J^{22}$ into a tube $C^7$ in the delivery vessel, and in this tube is disposed the stem $C^5$ of a valve $C^4$, which controls the outlet-orifice of the vessel. The liquid entering the tube forces the valve onto its seat against the action of a spring $C^8$, and the liquid passes between the head of the stem and the walls of the tube and through the holes $c$ in the latter into the delivery vessel. In the compartment $J^3$, which communicates with the interior of the delivery-chamber by a conduit $J^{23}$ and with the atmosphere by a passage $L'$, is situated a valve $J^{11}$, similar in construction to the valve $J^5$. In order to insure that the liquid entering the receiver will not leak out through the gas-relief valve after the vessel has been filled, a float-valve P is fitted within a tube $A^2$ in the receiver. The tube $A^2$ has a flange or collar on its upper end, which rests in a recess or opening in the top of the receiver, and the tube is open or provided with openings at its lower end to permit the liquid to enter and raise the valve. In line with the tube $A^2$ is fitted a hollow extension $Q'$ of a casing Q, and the parts $Q'$ and $A^2$ are held together in a fluid-tight manner by a stuffing-gland $A^8$. The lower end of the extension $Q'$ is adapted to form a seat for the conical end $P'$ of the valve P, which is provided with a rubber or other facing $P^2$. The valve P is not forced against its seat until the chamber is filled. As the liquid enters it forces any gas or air in the vessel out through the valve, the liquid entering the vessel finally forcing the valve against its seat, preventing any leakage of liquid through the valve-opening and at the same time by forcing the gas or air out of the chamber as it enters, insuring a full charge of liquid in the chamber. The valve is operated mechanically to permit the excess gas to escape from the receiver after each aerating operation by a rod or plunger R, which slides in the tubular extension $Q'$ and is normally pressed upward by a spring $R'$. Bearing on the upper end of the rod R is one end of a rocking lever $R^2$, which is fulcrumed to the tubular pillar or column V. The other end of the lever $R^2$ is provided with a cam surface or incline, which engages with a cam $G'$ on the valve-operating spindle H and is so arranged that when moving in one direction the cam $G'$ raises the end of the lever $R^2$, causing the other end to depress the rod and force the float-valve from its seat; but when moving in the other direction the cam $G'$ overrides the rocking lever. The conduit $Q^2$ opens into a chamber $Q^3$, in which is situated a double valve S S'. The end S of the double valve controls the inlet to the chamber and is provided with holes $S^2$, through which air or gas at low pressure can pass without operating the valve. The other end, S', of the double valve is in the form of a plug and is kept away from its seat by a spring $S^5$. This end of the valve is provided with a rubber facing $S^3$ and has around its periphery a series of holes $S^4$, through which the low-pressure fluid can pass the valve without forcing it onto its seat and escape to the atmosphere by an outlet $Q^4$. In the side wall of the chamber $Q^3$ is a conduit $Q^5$, leading to a chamber $Q^6$, conveniently formed in the same casing as the chambers $Q'$ and $Q^3$. In the chamber $Q^6$ is situated a weighted plug-valve T, normally resting on its seat $Q^7$. The valve may be provided with a spring to cause it to seat more rapidly. When the valve P is pressed from its seat by the rod R, the gas in the chamber A passes by the tube $A^2$ through the valve and by the conduit $Q^2$ into the chamber $Q^3$, in which is situated the double valve S S'. The holes $S^2$ in the inlet end of the valve are insufficient to permit the high-pressure gas to pass the valve rapidly, and this gas, acting on the solid head or end S of the valve, forces the end S' of the valve onto its seat against the action of the spring $S^5$. The gas is thus prevented passing by the opening $Q^4$ to the atmosphere, and after the end S' of the valve has been seated it passes by the openings $S^2$ into the chamber T' of the valve T and by the openings around the periphery thereof into the hollow stem $T^3$, passing thereafter through the pipe F to a preliminary enriching-chamber M, Fig. $1^a$, into which the liquid enters before passing to the receiver and from which it is forced by the pressure into that vessel. If desired, the gas discharged from the delivery vessel C may also be led into the chamber $Q^3$, so that it can pass to the atmosphere or to the preliminary enriching vessel, in accordance with its pressure. A check-valve F' is placed upon the pipe F to prevent back pressure, and the liquid-inlet to the preliminary enriching vessel is preferably controlled by a float-valve M'. This valve arrangement, in addition to promoting economy and efficiency, enables the apparatus to be employed with water either at high pressure from the service-main or at low pressure from a filter, storage-tank, or other suitable source. The gas which is thus periodically discharged from the apparatus instead of escaping to the atmosphere is employed in the preliminary enriching vessel, into which it is directed by the above-described valve mechanism to effect the enrichment or partial aeration of the liquid, and thereby permits of a lower gas-pressure being used in the receiver. The cams G, $G'$, $G^2$, and $G^3$ for operating the valves $D^4$, P, $J^5$, and $J^{11}$ are all arranged on a vertical shaft or spindle H, and in order to prevent the valves from being overrun or opened for an insufficient period the cams are arranged so that they operate their respective valves at each end of the shaft's motion only, and the shaft is provided with a projection which is adapted to engage with stops, thus obviating or minimizing the danger of the apparatus being improperly worked or injured by careless manipulation on the part of the attendant. Between the spindle $D^7$ and the cam G is disposed a slipper U to reduce the friction between the parts, or, if desired, the valve-stem may be provided with an antifriction-roller.

The operation of the apparatus above described will be hereinafter set forth.

Referring now to the apparatus illustrated in Figs. 3, 4, 5, and 6, the receiver 1A is formed of two similar parts, the lower of which forms the cover of the reservoir 1B, and the bolts securing the parts together pass through a flange on the top of the reservoir. The pipe $1B^3$, by which the mixture passes to the lower part of the reservoir, is secured to the outlet formed in the lower part of the receiver. The receiver is connected to the valve-casing 1J by two hollow pillars or supports $1V'$ $1V^3$, (see Figs. 4, 5, and 6,) and the pipe 1I, by which the liquid is conveyed from the pipe $1B^*$ on the reservoir, is disposed within the pillar $1V^2$ and leads the liquid to a vulcanite or other pipe $1I'$, disposed in a conduit in the casing 1J. The pipe $1I'$ opens into the conduit $1J^4$, leading to the valve-chamber $1J^2$. (See Figs. 4, 5, and 6.) The excess gas escapes from the delivery vessel by the conduit $1J^{23}$ to the valve-chamber $1J^3$ and after passing through the valve is led through a conduit $1J^{18}$ to a tube $1L^2$, disposed in the casing, to the conduit $1L'$, situated within the pillar $1V'$. From the lower end of the conduit $1L'$ the gas is conveyed by the conduit $1Q^8$ to the chamber $1Q'$, passing thereafter by the conduit $1Q^2$ into the chamber $1Q^3$, or this gas may be allowed to pass direct to the atmosphere. The operating-spindle 1H is disposed horizontally, and the cams 1G $1G'$ $1G^2$ $1G^3$ are arranged around it and are disposed in a recess in the casing 1J. In the normal position the cam $1G^3$ keeps the valve $1J^{11}$ away from its seat, and the cam $1G^2$ is formed in one with and connected to the cam 1G. In operation the shaft 1H is moved clockwise through a quarter-turn, and at the commencement of the motion the valve $1J^{11}$ closes. The cam 1G then acts on the spindle of the valve $1D^4$ to admit gas to the receiver, and thereafter the valve $1J^5$ is opened by its cam $1G^2$ to admit aerated liquid to the delivery vessel. After the delivery vessel is filled the shaft 1H is returned, and in returning the cam $1G'$ causes the rocking lever $1R^2$ to depress the rod 1R and force the float-valve away from its seat, and the cam $1G^3$ opens the gas-escape valve $1J^{11}$ on the delivery vessel.

In operation of both forms of the apparatus above described successive charges of liquid and gas are admitted to the receiver and are forced by the pressure of the gas therein into the aerating-chamber. After the aerating-chamber has been filled with aerated liquid the excess gas is allowed to escape from the receiver through the opening in the bottom of the tube $A^2$ or $1A^2$ and through the valve P or 1P, after which a charge of unaerated water enters through the valve $A^4$ or $1A^4$, and in this condition the apparatus may be allowed to stand for any reasonable length of time. If it is desired to draw off a charge, the spindle H or 1H is turned, causing the cam G or 1G to operate the valve $D^4$ $1D^4$ and admit the gas, which forces the water from the receiver into the aerating vessel, displacing therefrom an approximately equal portion of aerated liquid, which passes to the valve-chamber $J^2$ or $1J^2$, and as this valve has been now opened by its cam the liquid passes into the delivery vessel, closing the outlet-valve therein. On returning the operating-spindle or allowing it to return the gas-valves $J^{11}$ or $1J^{11}$ and P or 1P on the delivery vessel and receiver, respectively, are open, allowing the gas to escape from the vessels either to the atmosphere or to the preliminary enriching vessel in the manner already described. The opening of the gas-relief valve on the delivery vessel permits the outlet-valve to open under the action of its spring to deliver the liquid free from gas-pressure, and the opening of the gas-relief valve on the receiver permits a fresh charge of liquid to enter. As each successive charge enters the reservoir it carries with it a certain amount of free gas, which in addition to agitating the liquid tends to keep it in an aerated and sparkling condition. This series of operations can be repeated as above as required, the apparatus being always in working order and not requiring readjustment or any special period of time to elapse between the pulls.

Instead of providing the delivery vessel with a valve operated by the pressure of the liquid the outlet of the vessel may be controlled by a tap or cock $C^{10}$, (see Figs. 7 and 8,) the stem of which is connected to a bell-crank lever $C^{11}$, to which is pivoted a link $C^{12}$, carrying a strap $C^{13}$, engaging with an eccentric or cam on the cam-shaft H. This cam is so arranged that the outlet-valve $C^{10}$ is closed when liquid is admitted to the delivery vessel and opened after the valve $J^{11}$ has been opened to reduce the gas-pressure therein.

In the construction showing a mechanically-operated cock $C^{10}$, as shown in Figs. 7 and 8, the eccentric on the shaft H for operating the cock is so set that a small portion of liquid leaves the vessel at high pressure through the cock before the reduction of pressure in the vessel and before the cock is fully opened to deliver the full charge, or any other suitable form of mechanically-operated discharge valve or cock may be employed.

What I claim as my invention, and desire to secure by Letters Patent, is—

1. In an apparatus for aerating liquids, the combination with a receiver into which gas and liquid are delivered from separate sources, an aerating-chamber into which the liquid and gas are forced by the pressure in the receiver, and a preliminary enriching vessel in which the liquid before entering the receiver is enriched by the gas periodically discharged from the main apparatus, of valve mechanism on the receiver by which gas and air escaping therefrom are discharged according to their pressure to the atmosphere or to the preliminary enriching vessel substantially as and for the purpose described.

2. In an apparatus for aerating liquids comprising a receiver into which gas and liquid are delivered from separate sources, an aerating-chamber into which the liquid and gas are forced by the pressure in the receiver and a preliminary enriching vessel, the combination with the receiver, of a valve normally open to the passage of low-pressure fluid and adapted to be closed by high-pressure fluid and means connecting the high-pressure opening of the valve with the preliminary enriching vessel for the purpose described.

3. In an apparatus for aerating liquids, the combination with a receiver into which gas and liquid are admitted from separate sources, a preliminary enriching vessel, of a valve controlling the discharge of gas and air from the receiver, a valve communicating therewith and normally open to low-pressure fluid and adapted to be closed by high-pressure fluid, a pipe for conveying the high-pressure fluid to the preliminary enriching vessel, substantially as and for the purpose described.

4. In an apparatus for aerating liquids, the combination with a receiver into which gas and liquid are admitted from separate sources and a vessel into which the liquid first enters and is enriched by the gas periodically discharged from the main apparatus, of a valve controlling the discharge of air and gas from the receiver, a valve communicating therewith and normally open to low-pressure fluid and adapted to be closed by high-pressure fluid and a valve normally closed to low-pressure fluid and adapted to be opened by high-pressure fluid, substantially as and for the purpose described.

5. In an apparatus for aerating liquids, the combination with a receiver into which gas and liquid are admitted from separate sources, an aerating-chamber into which the liquid is forced by the pressure in the receiver and a preliminary enriching vessel into which the liquid is first admitted and enriched by the excess gas discharged from the main apparatus, of a valve-chamber communicating with the receiver, a valve in the chamber controlling the discharge of air and gas from the receiver, a second valve-chamber communicating with the first valve-chamber, a valve in the chamber, means for retaining this valve normally open, means whereby low-pressure gas passes the valve without operating it, means whereby high-pressure gas causes the valve to close and cut off communication with the atmosphere and means whereby high-pressure gas is delivered to the preliminary enriching-chamber substantially as and for the purpose described.

6. In an apparatus for aerating liquids, the combination with a receiver, an aerating vessel and a preliminary enriching-chamber, of a valve-chamber communicating with the receiver, a valve in the chamber controlling the escape of air and gas from the receiver, a second valve-chamber communicating with the first chamber, a valve in the chamber, means for retaining the valve open to permit low-pressure fluid to pass from the valve-chamber to the atmosphere, means whereby low-pressure gas passes the valve without operating it, means whereby high-pressure fluid causes the valve to cut off communication between the valve-chamber and the atmosphere, a third valve-chamber communicating with the second chamber and with the preliminary enriching vessel, a valve in the chamber normally closed to low-pressure fluid and adapted to be operated by high-pressure fluid which passes through the valve to the preliminary enriching-chamber, substantially as described.

7. In an apparatus for aerating liquids, the combination with the receiver, the aerating-chamber and the preliminary enriching vessel of a valve-chamber communicating with the receiver, a float-valve in the chamber, a second valve-chamber, a double valve in the chamber, a head on the valve at the outlet end of the chamber having openings around its periphery, a spring retaining the valve normally away from its seat, a third valve-chamber and a check-valve in the chamber, substantially as and for the purpose described.

8. In an apparatus for aerating liquids comprising a receiver into which gas and liquid are admitted from separate sources and an aerating-chamber into which liquid is forced by the pressure in the receiver, of a float-valve controlling the escape of air and gas from the receiver, a guide for the float-valve, a spring-controlled rod for actuating the valve, a pivoted lever for operating the spring-controlled rod and means for operating the lever substantially as and for the purpose described.

In testimony whereof I have signed my name to this specification in the presence of two subscribing witnesses.

FRANK GEORGE HAMPSON.

Witnesses:
Wm. J. Dow,
Ernest F. Fottergile.